(12) United States Patent
Roitblat et al.

(10) Patent No.: US 8,266,121 B2
(45) Date of Patent: Sep. 11, 2012

(54) IDENTIFYING RELATED OBJECTS USING QUANTUM CLUSTERING

(75) Inventors: Herbert L. Roitblat, Ventura, CA (US); Brian Golbére, Ojai, CA (US)

(73) Assignee: Orcatec LLC, Marietta, GA (US)

( * ) Notice: Subject to any disclaimer, the term of this patent is extended or adjusted under 35 U.S.C. 154(b) by 0 days.

(21) Appl. No.: 13/205,031

(22) Filed: Aug. 8, 2011

(65) Prior Publication Data
US 2011/0295856 A1    Dec. 1, 2011

Related U.S. Application Data

(63) Continuation of application No. 11/848,603, filed on Aug. 31, 2007, now Pat. No. 8,010,534.

(60) Provisional application No. 60/824,254, filed on Aug. 31, 2006.

(51) Int. Cl.
G06F 17/30  (2006.01)

(52) U.S. Cl. ........................ 707/694; 707/737

(58) Field of Classification Search ............... 707/737, 707/738, 802, 797, 798, 999.006, 999.101, 707/694, 696, 829; 715/243, 854
See application file for complete search history.

(56) References Cited

U.S. PATENT DOCUMENTS

| | | | |
|---|---|---|---|
| 6,349,296 B1 * | 2/2002 | Broder et al. .................. 1/1 |
| 6,658,423 B1 | 12/2003 | Pugh et al. | |
| 6,993,535 B2 * | 1/2006 | Bolle et al. ..................... 1/1 |
| 7,574,409 B2 * | 8/2009 | Patinkin ......................... 706/12 |
| 7,725,484 B2 | 5/2010 | Nister et al. | |
| 7,743,061 B2 | 6/2010 | Jones et al. | |
| 7,836,043 B2 | 11/2010 | Jensen et al. | |
| 2002/0133499 A1 | 9/2002 | Ward et al. | |
| 2006/0224562 A1 | 10/2006 | Yan et al. | |

OTHER PUBLICATIONS

Broder, Some applications of Rabins's Fingerprinting Method, in R. Capocelli, A. De Santis, and U. Vaccaro, editors., Sequences II: Methods in Communications, Security, and Computer Science, pp. 143-152, Springer-Verlag, 1993.
Broder, On the Resemblance and Containment of Doucments, Proceedings of the Compression and Complexity of Squences, Jun. 1997.
Broder et al., Syntactic clustering of the Web, Proceedings of the Sixth International WWW Conference, Apr. 1997.
Chowdhury et al., Collection Statistics for Fast Duplicate Document Detection, 2002, ACM Transactions on Information Systems (TOIS), vol. 20, No. 2.

* cited by examiner

*Primary Examiner* — Marc Filipczyk
(74) *Attorney, Agent, or Firm* — Dardi & Herbert, PLLC; Peter S. Dardi

(57) ABSTRACT

Techniques for grouping related objects such as documents and files using quantum clustering are disclosed. A method may include constructing a feature-object database of multiple objects. The feature-object database may have quantized selected features as keys. A connected objects database maybe built. Clusters of connected objects may be identified in the connected objects database. The clusters of identified objects may be evaluated to determine groups of related objects. The method may be implemented on a computing device.

17 Claims, 9 Drawing Sheets

IDENTIFYING RELATED OBJECTS USING QUANTUM CLUSTERING

RELATED APPLICATION INFORMATION

This application is a continuation of U.S. patent application Ser. No. 11/848,603, now U.S. Pat. No. 8,010,534 to Roitblat et al., filed on Aug. 31, 2007, entitled "Identifying Related Objects Using Quantum Clustering," incorporated herein by reference, which claims priority to U.S. Provisional Application Ser. No. 60/824,254, filed Aug. 31, 2006, incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to analysis and evaluation of objects such as computer readable documents and files to determine whether and the extent to which they are related, and clustering or grouping the related objects, documents, and files.

2. Description of the Related Art

Clustering is the process of grouping together objects with similar features so that the similarity among the objects (for example, documents) in a group is greater than the similarity of objects (for example, documents) between groups. The generic term for something that may be analyzed for relatedness is an object. A group of objects may be analyzed and related objects may be grouped into clusters. Documents are an example of the kind of objects that may be clustered using the techniques described herein.

There are a variety of ways to define similarity, but one way is to count the number of words that overlap between each pair of documents. The more words they have in common, the more likely they are to be about the same thing.

If the documents to be clustered are represented as vectors, then cosine similarity, cross product, or Euclidean distance metrics can be used. Distance is the inverse or complement of similarity. The more similar a pair of documents is, the lower their distance from one another. That is, they are closer. In the vector space model, each word in the vocabulary is represented by a position in the vector. If a word is present in the document, then the corresponding element of the vector is set to be nonzero. If the word is absent for a particular document, then the corresponding element of the vector is set to 0.

Many clustering tools build hierarchical clusters of documents. Some organize the documents into a fixed number of clusters (e.g., K-means clustering). In many cases, the clustering algorithms start with a randomly selected set of documents to serve as seeds for each cluster. Then each additional document is put into the same cluster as the most similar one already processed. The organization of the clusters may depend on exactly which documents were randomly chosen and may change from one run of the clustering algorithm to the next.

Commonly used procedures for constructing clusters can be categorized as either agglomerative or partitional. In the agglomerative approach, clusters start small, typically with only one document. Clusters are then built by adding documents to existing clusters. The partitional approach typically starts with one cluster, and each cluster is thereafter subdivided to make new smaller clusters.

Documents can be joined to a cluster based on single linkage, in which the distance to cluster is the measured as the distance to closest element of the cluster; complete linkage, which measures the distance to the farthest element of the cluster, or average linkage, which measures the distance to the centroid or average member of the cluster.

The most commonly used clustering algorithms are limited in their usefulness by their computational complexity. Many clustering algorithms take time $O(n^2)$ or $O(n^3)$, with many iterations through the data to cluster the n documents. This time requirement makes them impractical for use in large data sets.

Another limitation of most clustering algorithms is that they are designed to put every document into a cluster. The goal is to put every document into the nearest, most similar cluster, but the more distant a document is from the cluster's center, the less like the cluster it is. This is most obvious in cluster schemes that start with all documents in a single cluster. At that point cluster membership provides almost no information about the content of a document. K-means clustering is designed to put all documents into a set of k clusters, where k is determined before clustering begins. It is often not obvious what the right number of clusters should be.

The two biggest contributors that cause traditional clustering algorithms to suffer their limitations are representing documents as vectors, and having to iterate repeatedly over a document set to handle the cluster assignments. The clustering methods described herein overcome the limitations imposed by these two factors.

DETAILED DESCRIPTION

In various contexts, from an Internet search, to genetic research, to a shopping data mining, to business intelligence, objects are clustered to allow for a quicker and more efficient analysis to be made. Similar objects are grouped together, which highlights the ways in which these objects are similar and allows the analyst to react to the objects as a group. For these and other reasons clustering of objects is beneficial. A method of clustering objects referred to as quantum clustering is described herein.

Environment

Figure 1:
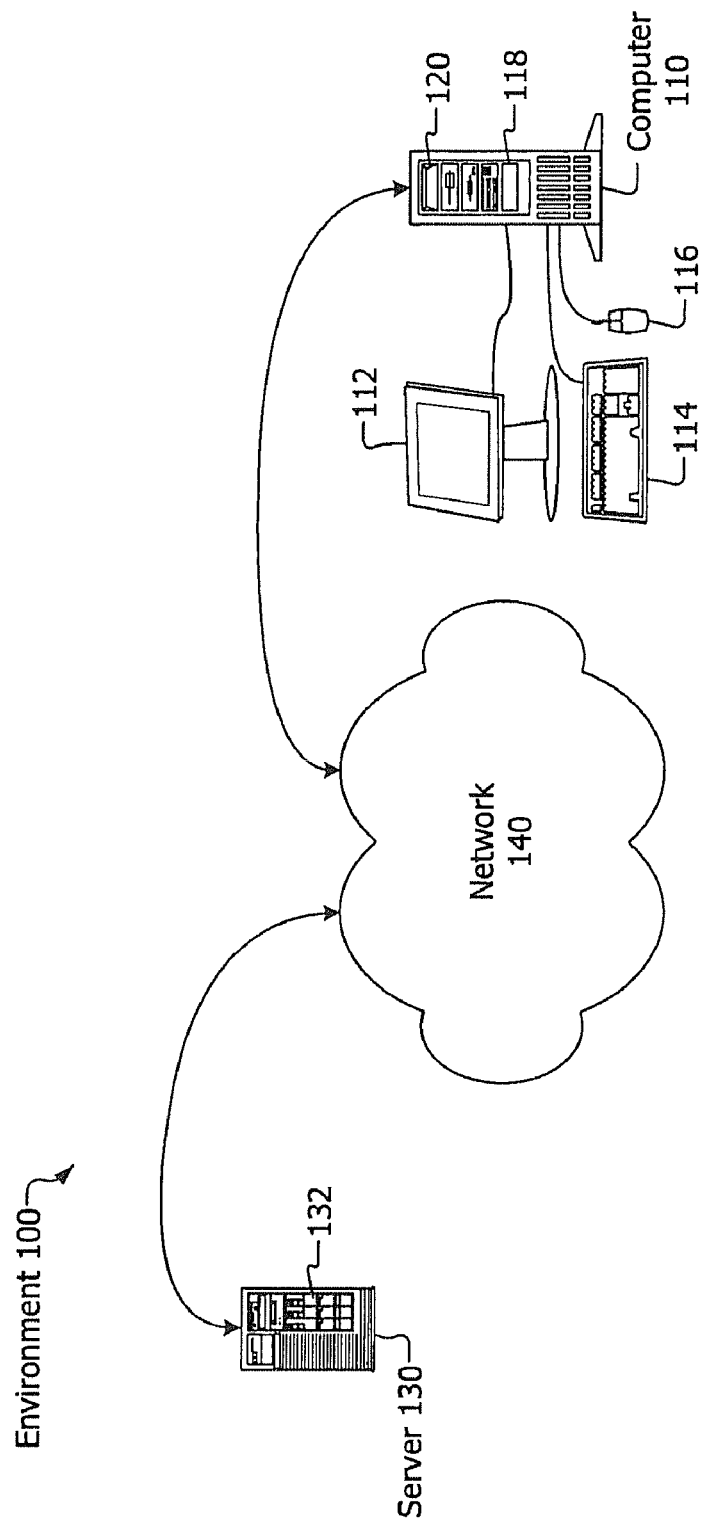
FIG. 1 is a block drawing of an environment in which quantum clustering methods may be implemented.

FIG. 1 is a block drawing of an environment 100 in which quantum clustering methods may be implemented. The quantum clustering methods described herein may be implemented in software and executed on a computing device such as server 130 and/or computer 110.

A computing device as used herein refers to a device with a processor, memory, and a storage device. Computing devices are capable of executing instructions. The term computing device includes, but is not limited to, personal computers, server computers, computing tablets, set top boxes, video game systems, personal video recorders, voice over Internet protocol (VOIP) telephones, analog telephones, digital telephones, mobile telephones, cellular telephones, personal digital assistants (PDAs), portable media players, portable audio players (including MP3 players), portable computers, notebook computers, and laptop computers. Computing devices may run an operating system, including, for example, variations of the Linux, Unix, MS-DOS, Microsoft Windows, Palm OS, Symbian, and Apple Mac OS X operating systems.

A computing device may include or be coupled with a display, such as display 112 shown coupled with personal computer 110. The computing device may be coupled with or include one or more user input devices, including, for example, keyboard 114, mouse 116, a track ball, a scroll wheel, a touch pad, a key pad, a touch screen, navigation buttons, a joystick, a pen and tablet, a stylus and touch screen, and/or others. A user may use a user input device to click on, select, or otherwise activate or control a user interface item such as a button, link, slider, etc. and to provide input to the operating system or programs running on the personal computer via a graphical user interface, text interface or other user interface provided on the computing device. The personal computer 110 and other computing devices may include a network interface. The personal computer 110 and other computing devices may include other components which are not discussed herein.

The network interface in a computing device may be a card, chip, or chip set that allows for communication over a network 140. The network may be and/or include one or more of each of a local area network (LAN), a wide area network (WAN), a wireless wide-area networks (WWAN), a global system for mobile communications (GSM) network, an enhanced data for GSM evolution (EDGE), a public switched telephone network (PSTN), and others. The network 140 may be or include the Internet. The network 140 may support various versions of the Ethernet protocol, the Internet protocol, and other data communications and/or voice communications protocols. The network 140 may be or include one or more of each of a packet switched network and/or a circuit switched network.

Computing devices may include communications software that allows for communication over one or more networks. Depending on the computing device and the network, the communications software may provide support for communications using one or more of the following communications protocols or standards: the User Datagram Protocol (UDP), the Transmission Control Protocol (TCP), the Internet Protocol (IP), and the Hypertext Transport Protocol (HTTP); one or more lower level communications standards or protocols such as, for example, the Gigabit Ethernet standards, the Fibre Channel standards, one or more varieties of the IEEE 802 Ethernet standards, and other protocols.

The techniques described herein may be implemented in software stored on storage media accessible either directly or via a storage device included with or otherwise coupled or attached to a computing device. Similarly, files and documents are also stored on storage media accessible either directly or via a storage device included with or otherwise coupled with or attached to a computing device. As such, storage media are readable by a computing device or machine. Storage media may be referred to as machine readable media. Storage media include, for example, magnetic media such as hard disks, floppy disks and tape; optical media such as compact disks (CD-ROM and CD-RW) and digital versatile disks (DVD and DVD±RW); flash memory and flash memory cards; and other storage media. A storage device is a device that allows for reading and/or writing to a storage medium. Storage devices include, hard disk drives, DVD drives, flash memory devices (such as readers and writers), and others. As shown, personal computer 110 includes a hard disk drive 118 and a DVD-RW drive 120 and server 130 includes hard disks 132.

The quantum clustering methods may be used to organize documents for analysis and review. Objects are clustered to allow for a quicker and more efficient analysis to be made. Clustering similar objects together highlights the relationships among these objects and allows the analysis to react to the objects as a group. The method is not limited to documents. The method may generically be used with objects of various kinds. The kinds of objects discussed herein are documents and files. Other kinds of objects to which the system might apply include DNA sequences, the amounts of various proteins in a sample, and others.

The terms "documents" and "files" are used interchangeably herein. The terms documents and files include documents and files that contain human readable text such as, for example, documents and files produced by word processing programs, including document files such as .DOC files produced by Microsoft Word and open document text .ODT files produced by Open Office Writer, as well as .TXT text files, .RTF rich text format files, and .PDF portable document format (PDF) files. The terms documents and files also include media files such as audio files, video files and still images in various formats, including, for example, Joint Photographic Experts Group (JPEG), Graphics Interchange Format (GIF), Portable Network Graphics (PNG), Tagged Image File Format (TIFF), Moving Pictures Expert Group-4 (MPEG-4), MPEG-7, and others, and particularly those media files that include meta-data, namely information about the media included in the file. The terms documents and files include formatting and mark-up files such as those in the Hyper-Text Markup Language (HTML), Standard Generalized Markup Language (SGML), Synchronized Media Integration Language (SMIL), Extensible Markup Language (XML), User Interface Markup Language (UIML), their variants, and others.

The software that implements the methods described herein may be in the form of, for example, an application program, one or more modules, instructions, code, modules, and scripts, applets (e.g., a Java applet), subroutines, an operating system component or service, firmware, and/or a combination thereof. The software may be implemented in one or more programming languages such as, for example, high level programming languages including C, C++, Java, Visual Basic, and others; or low level assembly and machine language. Software may be machine readable.

The software may be stored as or on and the method may be implemented in whole or in part from one or more Field Programmable Gate Array (FPGAs), Application Specific Integrated Circuit (ASICs), programmable logic devices (PLDs), programmable logic arrays (PLAs), and other chip-based hardware and firmware.

The methods described herein may be implemented on a single computing device such as personal computer 110 or server computer 130, or may be implemented on a group of computing devices arranged in a network, cluster, or other organization. The methods described herein may be implemented using client-server functionality.

Methods

Figure 2:
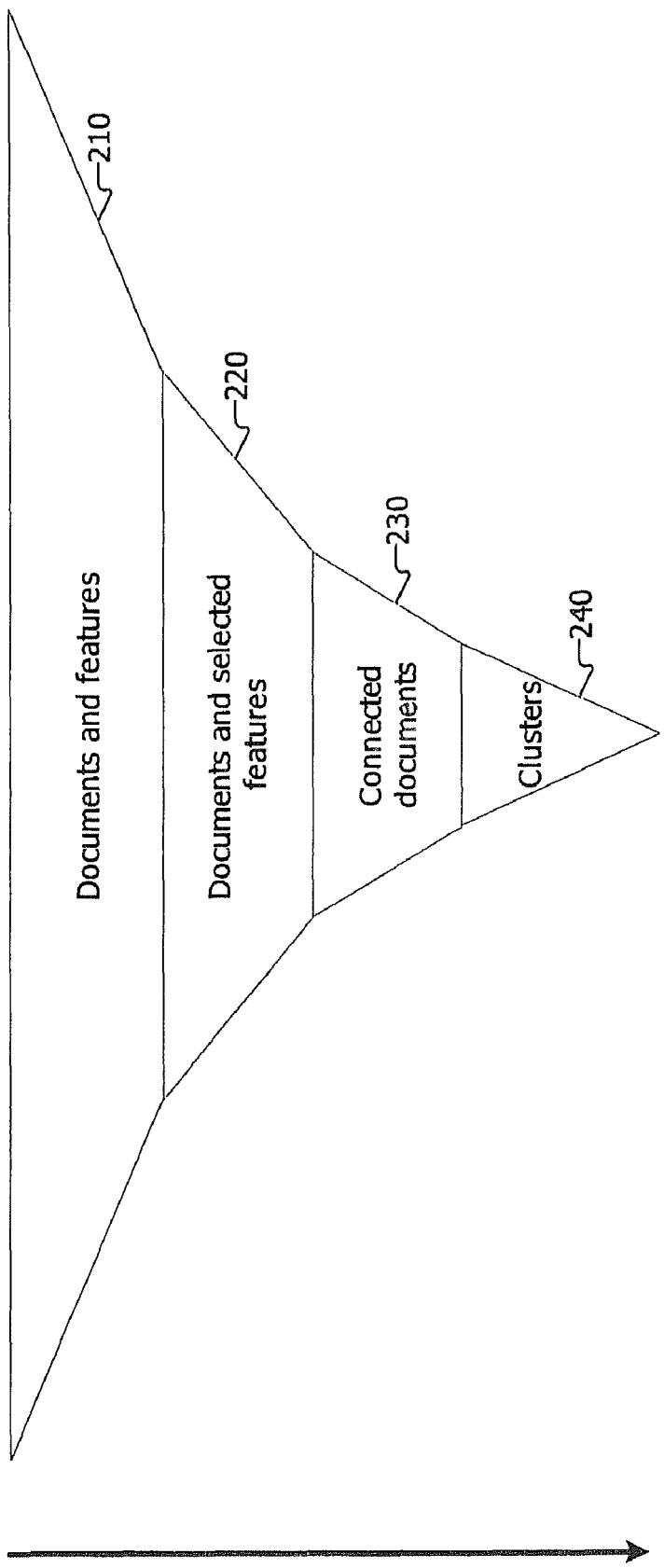
FIG. 2 is a conceptual drawing of the refinement of a document into clusters.

To understand what the quantum clustering method described herein achieves, a review of the conceptual drawing of the refinement of a document into clusters shown in FIG. 2 is instructive. As the method described herein proceeds, as shown by the vertical downward pointing arrow, documents and their features are received, as shown in block 210. The width of the elements 210, 220, 230 and 240 reflects the number of items, both documents and their features, that must be considered at each stage of the method. Certain features are selected from the first group of items to form a second group of items that includes documents and selected features, as shown in block 220. The second group of items is analyzed and compared to determine which of the documents are connected, as shown in block 230. Documents are considered connected when they share a certain number of features. The number of features may be system defined or may be user configurable. Documents that are connected form a third group of items consisting solely of documents.

Figure 3:
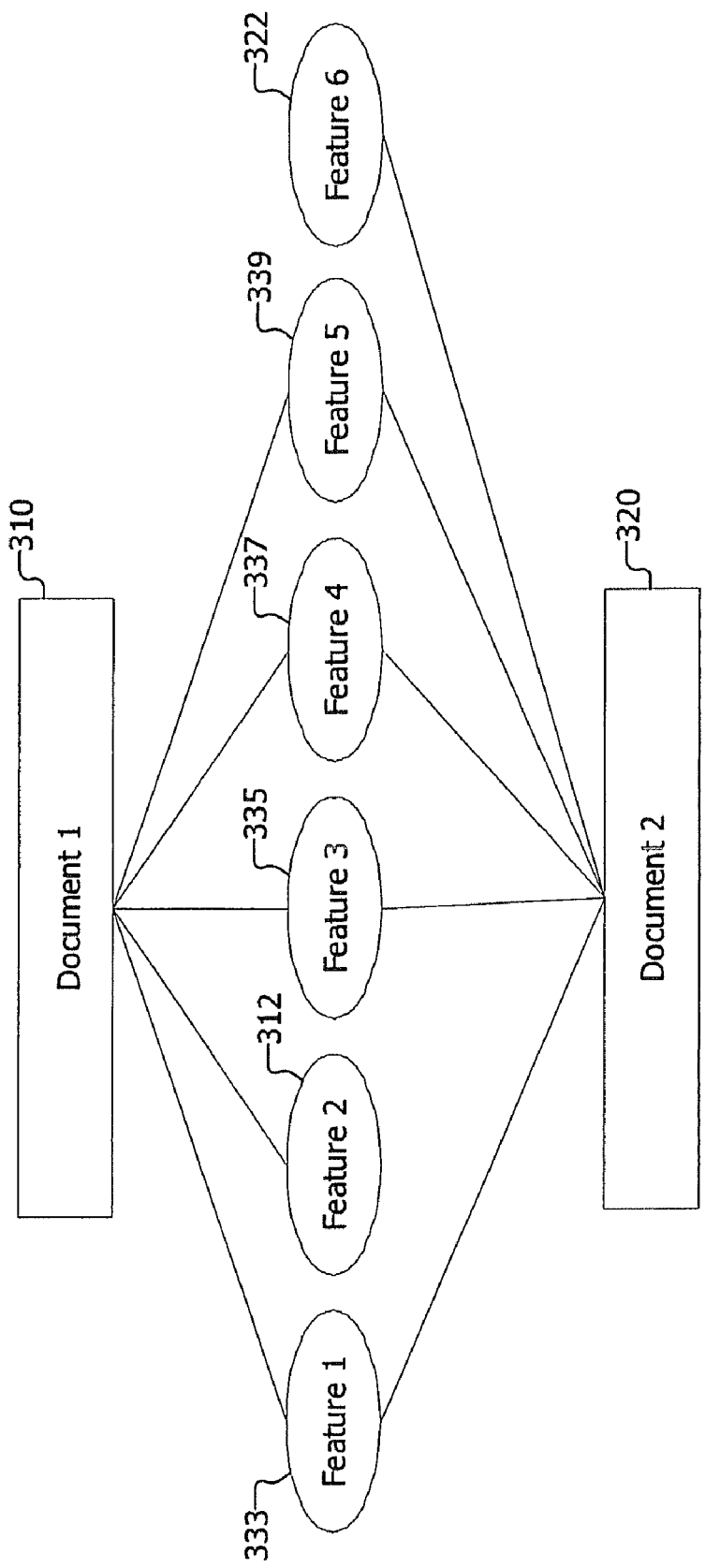
FIG. 3 is a block drawing showing shared features between two documents.

Documents that are connected may be seen in FIG. 3 in which shared features between two documents 310 and 320 are depicted. In this drawing, shared features include features 1, 3, 4 and 5 represented by elements 333, 335, 337 and 339. Features that are not shared and are not common between the two documents are features 2 and 6, shown as elements 312 and 322. Review of this drawing shows how the features connect related documents in a graphical way. Features in a document might be words or groups of words. In other kinds of objects, features may include such things as protein structures or substructures, nucleic acid sequences, or "shopping cart" contents.

Referring again to FIG. 2, the connected documents in the third group of items is organized to form clusters, as shown in block 240. A description of the methods of quantum clustering to obtain a group of related documents is described in more detail herein.

Figure 4:
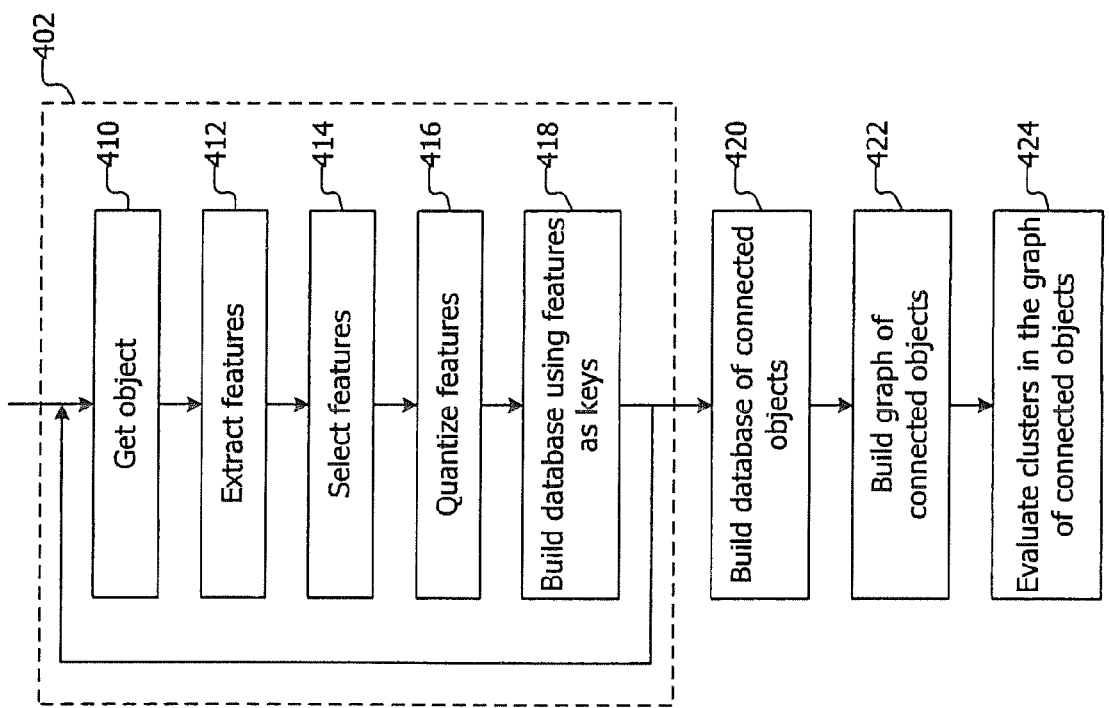
FIG. 4 is a flow chart of the actions taken to achieve a method of quantum clustering.

FIG. 4 is a flow chart of the actions taken to achieve a method of quantum clustering. Although the method may be applied to documents, this drawing and related discussion refers to a more generic application of quantum clustering involving objects. In quantum clustering, objects are grouped in clusters on a feature by feature basis. Objects and their corresponding features are provided to the clustering system. To construct a feature-object database of objects accessible by features, the following actions may be taken as shown in block 402. An object is obtained, as shown in block 410. Features from the object are extracted, as shown in block 412. Features from the object are selected, as shown in block 414. Features from the object are quantized (if necessary), as shown in block 416. The feature-object database is built using the features as keys, as shown in block 418. After the feature-object database is built, a database of connected objects, the connected object database, is built, as shown in block 420. Using the database of connected objects, a graph of connected objects is built, as shown in block 422. In the feature-object database (see block 418), the keys are the features, and the values are the documents that have that feature. In the connected objects database (see block 420), the keys are two documents, and the content is the number of shared features between the two documents. Clusters in the graph of connected objects are identified and evaluated, as shown in block 424. The evaluation of clusters may be performed by walking the graph or using other graph traversal algorithms.

Descriptions of the terms, concepts and processing discussed in the preceding paragraph are provided in the remainder of this patent.

Preprocessing

During preprocessing, the objects to be clustered may be represented as sets of feature/value pairs. When the objects to be clustered are documents or files, text included in the documents or files may be broken into words. According to the method described herein, the word is the "feature" and the number of times the word occurs in the document is the "value". Alternatively, the feature could be a word and the value might be a 1 to indicate that it occurs in the document, or the feature could be a group of words. Stopwords may be optionally discarded during this processing. A stopword is a word that occurs so often in the language that it conveys little useful meaning. Words such as "I," "and," and "the" are not useful index terms, and are considered stopwords.

In one version of this method, the document is first broken into paragraphs or existing paragraphs are identified. The features are constructed from word groups that co-occur in the paragraph. Word groups may be pairs, triples or some other number of words in combination. Word groups are considered to be features and the value of the feature may be the frequency with which the word (unigram), pair (bigram), or triple (trigram) occurs in the paragraph or in the document. A word group refers to the existence of each of the words in the group in a single paragraph or document. The words in the word group need not be adjacent to one another. Other metrics may be used to set a value for the words. For example, the value could be a measure of the mutual information two words have for each other, or the value may be measured as a deviation from the expected frequency of the pair relative to the frequencies of the individual words.

In another version of this method, the document is broken into overlapping "shingles" of s successive words. For example, the following text could be translated into shingles with shingle length s=3 as follows.

Text: the following text could be translated into shingles
Shingles:
[the following text]
[following text could]
[text could be]
[could be translated]
[be translated into]
[translated into shingles]

In this embodiment, each shingle is a feature and the frequency with which each shingle occurs in the document is the shingle's value. Optionally, these features may be given a numeric code, for example by applying a hash function. In this embodiment, the features are numeric codes and the values are the number of times the shingle occurs in a document.

However the feature/value pairs are constructed, each document or other object is represented as a set of these feature/value pairs. In many traditional clustering systems, features are cast into an ordered list in which the first item in the list stands for a particular feature, the second stands for a second feature, etc. The same feature is always represented by the same location in the list. These ordered feature lists along with their respective values are then treated as vectors. Similarity between two vectors may be measured in various ways. For example, the similarity between two vectors may be measured by the cosine of the angle between the two vectors, by the Euclidean distance between them, or by some other method.

In some traditional clustering methods, each document is compared with each other document or cluster by numerically comparing the vectors representing the documents. The same numbers are compared repeatedly as the documents are compared: document 1 with document 2, document 1 with document 3, document 2 with document 3, etc. The quantum clustering method described herein takes a different approach. The quantum clustering method treats the feature/value pair as basic quantal units that can be indexed, thereby transforming the multiple comparison clustering problem into a search problem.

Quantizing Values

Rather than work with continuous feature/value pairs, quantum clustering transforms the values into indexible discrete units. If the values that a feature can take on are binary in which the numbers 0 and 1 are used to represent whether words or strings are either present or absent, the features themselves (in this embodiment, those that have the value 1) may be used as the quantal value. For example, individual words or n-grams (in which bigrams are pairs, trigrams are triples, etc. of words or features) can be used as an indexible unit. This approach may be used to build a reverse index of a document set. Using a reverse index, it is possible to search for documents using one or more of these indexible units as a query.

When the values that a feature can take on are not binary, then a further step is needed to quantize them. Continuous variables can be quantized into ranges, which may or may not overlap. Each range of values may have a corresponding representative code. Consider, for example, a feature that can take on a value between 0.0 and 1.0. Each of the value ranges could be a corresponding representative code in the form of a letter or series of letters. In this example, a letter code of length three is used as the representative code.

| Original range | Letter code |
| --- | --- |
| 0 to 0.1250 | AAA |
| 0.0625 to 0.1875 | BBB |
| 0.1250 to 0.2500 | CCC |
| 0.1875 to 0.3125 | DDD |
| 0.2500 to 0.3750 | EEE |
| 0.3125 to 0.4375 | FFF |
| 0.3750 to 0.5000 | GGG |
| 0.4375 to 0.5625 | HHH |
| 0.5000 to 0.6250 | III |
| 0.5625 to 0.6875 | JJJ |
| 0.625 to 0.7500 | KKK |
| 0.6875 to 0.8125 | LLL |
| 0.7500 to 0.8750 | MMM |
| 0.8125 to 0.9375 | NNN |
| 0.8750 to 1.0000 | OOO |

The representative codes can be prefixed by a unique identifier for the feature to generate a synthetic vocabulary of terms representing the feature and its quantized values. An example synthesized term is "V01LLL" in which unique identifier "V01" for a feature is prepended to letter code LLL representing a quantized value. These synthesized terms take the place of the original variables and their values. Each document or object may be "described" by one or more of these, synthetic terms. And, these synthetic terms can be indexed.

In the example shown in the table above, the range represented by each letter code overlaps to avoid boundary problems in which a very slight change in value results in a large change in the quantized representation of that value. In the example, the value of 0.12 corresponds to both the letter code AAA and BBB. Two objects that originally had a value on a variable of or near 0.12 could be matched on the quantized values of either AAA or BBB, or both. These quantized values may also be represented by hash codes.

It may be counter-intuitive to transform an interval-level metric variable into a nominal one, but it has significant advantages. Primarily, this transformation allows the data set to be represented as a directed graph where the nodes are either quantized feature/value pairs or objects. Tools from graph theory may be used for clustering or otherwise processing these objects. These data could also be stored in a search engine and used like a document's vocabulary. In this sense, the method is a data reduction technique, reducing the object representation from its full range of continuous variables to the quantal features in the directed graph.

Figure 5:
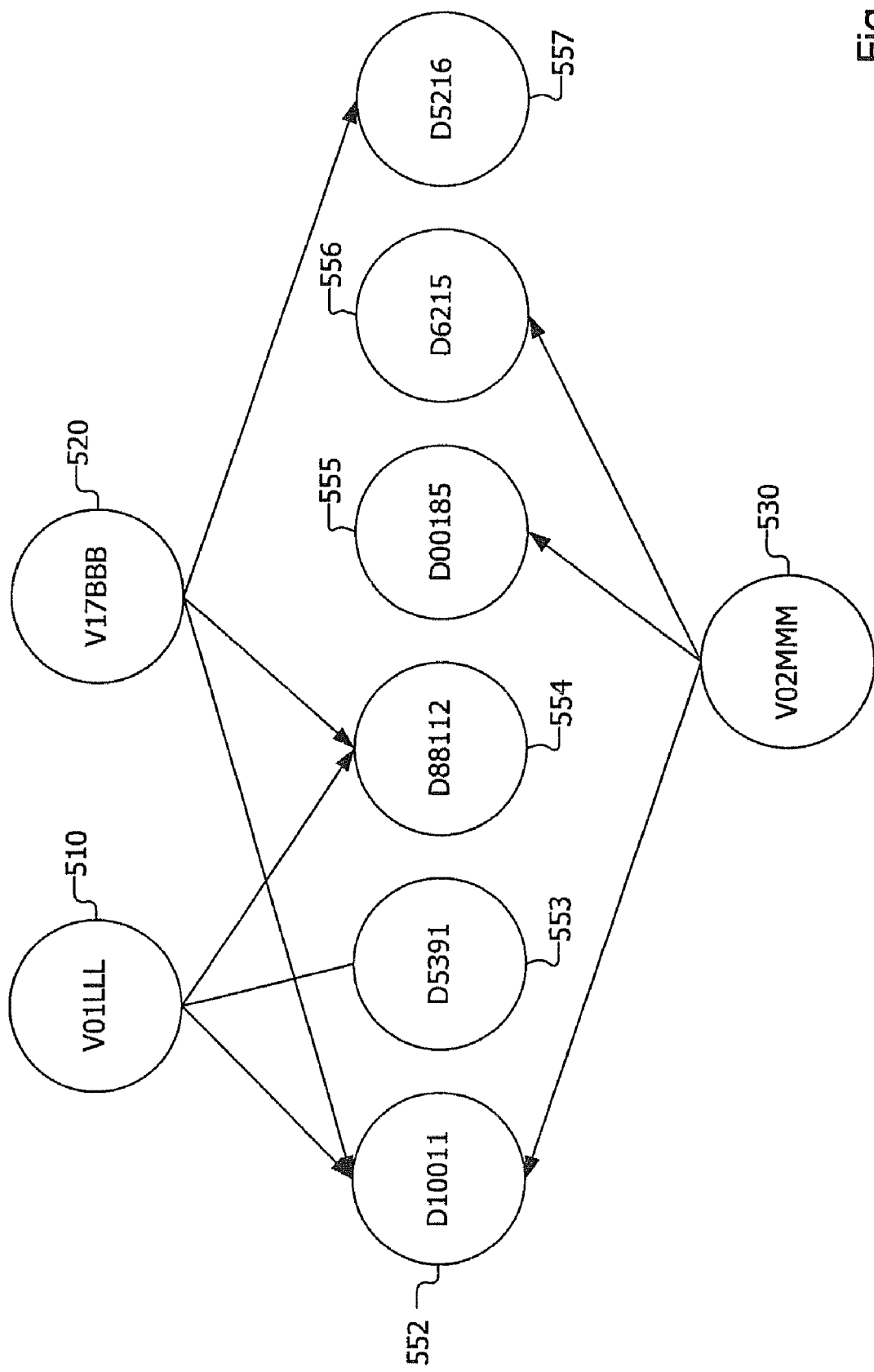
FIG. 5 is a block drawing showing a directed graph of features and documents.

FIG. 5 is a block drawing showing a directed graph of features and documents. This kind of graph may be used with any kind of objects, including documents and files. The features 510, 520 and 530 of the documents are shown in a directed graph to documents 552, 553, 554, 555, 556 and 557. This arrangement of documents and features allows for ready identification of documents that have particular features. For example, feature 530 is included in documents 552, 555 and 556. An adjacency list for the graph shown in FIG. 5 is V01LLL: D10011, D45391, D88112
V02MMM: D00184, D10011, D6215
. . .
V17BBB: D10011, D5216, D88112

An adjacency list may relate objects, such as documents, and their features/values. An adjacency list is a list of the vertices in a graph, such as the graph shown in FIG. 5. Each element in the adjacency list, in turn, contains a list of all of the vertices to which the head vertex is adjacent, that is, connected directly. The head of each row in the adjacency list contains a synthesized term that represents both the feature (variable) and a quantal value on that feature. For example, the term V01LLL indicates that an object has a value between 0.6875 and 0.8125 (as represented by the LLL) on variable V01. Objects D10011, D45391, D88112, each contain or is described by V01LLL, which means that these objects contain feature V01 having quantized value LLL.

Similar graphs (or networks) may be created in which the directed edges point from the document identifiers to the features. This kind of graph makes it easy to visually identify documents that belong in the same cluster when one of these documents is known.

Selecting Features

Feature selection is an optional step. Certain features may be selected to be representative of the object. These selected features may be referred to as a sketch (or feature subset), because they represent some characteristics of the object, but not all of the details. A sketch is optional. When objects are characterized by only a few features, there may be little to gain from reducing the number to be considered. In these situations, all of features may be used. In some implementations, the number of features used is reduced to increase the efficiency of processing. When dealing with objects such as documents, however, with their very large set of features (that is, each word is unique), then feature selection may be an important part of the process. Documents can contain hundreds or thousands of words. Because each unique word could be a feature, keeping all of the words is impractical.

Reducing the number of features may also be referred to as "dimension reduction". Reducing the number of features may be performed using a number of methods, for example, using latent semantic indexing (also called latent semantic analysis) which reduces the number of features to a set of orthogonal underlying dimensions using the statistics of singular vector decomposition. Latent semantic indexing may be used with the method described herein, and if so, it is followed by a quantizing step.

Other techniques may be used for reducing the number of features, including, for example, that described in Broder et al. U.S. Pat. No. 6,349,296. Broder's method uses an algorithm to reduce the features of a document to a "fingerprint." A fingerprint is a relatively short number that represents the features in a document. If two fingerprints are different, then it is certain that the objects that they represent are different. If two objects have the same fingerprint, then it is very likely that they are the same. Broder creates shingles of successive words (as described above) and fingerprints each one. The fingerprints of selected shingles are then used as a fingerprint of the document. Documents are sorted by fingerprint, and adjacent documents are considered near-duplicate candidates.

The method described herein extends Broder's method in at least two ways. First, instead of sorting tuples of document identifiers and fingerprints, the method described herein uses a graph data structure. This method is described in detail below. Second, the method extends this kind of feature selection-process to a wider variety of feature types. Broder's method is intimately tied to using a particular kind of fingerprint as features. The method described herein works with many, and likely all, kinds of features.

When a representative sketch can be derived for the objects in a collection, the use of a sketch can improve clustering performance. The improved performance results from the reduced number of features that are considered. The method includes novel ways of selecting features for the sketch. Broder and others have suggested selecting fingerprints according to the value of the fingerprint, namely the hash function. The lowest k fingerprint values may be chosen. Because the ordering of fingerprint values is unrelated to the ordering of the original features, this approach provides for a "random" selection of shingles that is consistent for similar documents. If two documents are identical, picking the smallest k fingerprints of the documents will yield the same fingerprints for the two documents. If two documents are nearly identical, this process will choose nearly the same "randomly selected" shingles. Because the hash functions produce random values relative to the text they encode, and because they produce the same result for the same text, any choice rule that selects shingles based on the value of the shingle will be systematically selecting for random text.

Shingling creates a hash for each of s sequential words. Rather than picking sequential words, it is possible to pick words that co-occur according to other patterns (the same arguments apply to nonword features, which may not have a natural order, for example, the variety of items purchased on a single supermarket visit). For example, word pairs that co-occur in the same paragraph may be used instead of two-word shingles. A co-occurring pair of words can be called a "digram."

To bound the range of co-occurrence, the range of words may be limited by considering only words that co-occur in paragraphs or other small portions of text. Paragraphs are a natural unit, because a paragraph is typically about a single subject or issue. As such, words that occur in a paragraph are typically all about one thing.

Other techniques not involving random selection may be used to select text to create a sketch. For example, one novel way to select sketch features is according to the information value of the features. Features that are more representative of the objects may provide a more useful representation of those objects than random features. A feature carries information about an object to the extent that that feature is characteristic of that object and not of other objects. The traditional approach common in information retrieval that attempts to convey this information is called TF-IDF. In the TF-IDF approach, TF represents the "term frequency", or the frequency with which a specific term occurs in the document being considered; and IDF is the "inverse document frequency", that is, the inverse of the number of documents containing that term. These two values may be multiplied together or some TF may be multiplied by some function of the IDF.

When the units consist of digrams (or any other pair or larger grouping of features), their information value may be estimated by the degree to which their frequency deviates from that expected based on chance combinations of their individual elements.

For example, the co-occurrence of the word pair "computer network" is informative as a pair of words to the extent that the occurrence of the pair cannot be explained by a chance (independent) pairing of the word "computer" and the word "network" in the same document. Those pairs that co-occur more often than would be expected based on the individual terms' marginal (independent) frequencies are especially informative as to the content of the document.

The information value v of a pair can be estimated using the equation:

$$v_{ij} = n(x_i y_j) - \frac{n(x_i)n(y_j)}{N}$$

where
n(x)=number of documents containing x
n(x,y) is the number of documents in which x and y co-occur
N=total document count
$v_{ij}$ is also related to mutual information I, which is computed as $$I(XY) = \sum_{y \in Y} \sum_{x \in X} p(x, y) \log \frac{p(x, y)}{p(x)p(y)}$$

where p(x,y) is the joint probability distribution function of X and Y and the log is in base 2 to measure mutual information in bits. Mutual information indicates the deviation of the joint distribution of X and Y from the product of their marginal distributions.

In another version of this process, a document is broken into overlapping "shingles" of s successive words. In one application, each shingle is sorted by $v_{ij}$ and the top k shingles are kept as a sketch of the document content. The value $v_{ij}$ may be used as a weighting factor for n-grams rather than unigrams. The advantage of using is that the sketch of each document consists of the n-grams that are most informative as to the content of that document. The words used to form the n-grams can also be selected based on their individual document frequencies, for example, by excluding any word that occurs in more than 50% of the documents or fewer than five documents. This filtering also provides the benefit of speeding the process in that fewer terms will be eligible for consideration as n-grams. In general, features that occur in a large proportion of the documents or in a very small proportion of the documents are not useful for clustering. Removing features that occur in a large proportion of the documents or in a very small proportion of the documents typically improves both speed of processing and accuracy of result.

In one embodiment, digrams are used. In this embodiment, each document is broken into overlapping shingles of 2 successive words. Each digram is sorted by $v_{ij}$ and the top k pairs are kept as a sketch of the document content.

Finding Clusters

Connected Documents

Most clustering systems compare each document's features with every other document's features or with the centroids of existing documents. The quantum clustering method is different. The quantum clustering method described herein starts with features and identifies documents that share features. Features that are contained in only a very few documents or in very many documents may be discarded as they are not helpful.

The method walks the graph of documents for each feature. The method creates or increments a counter for each pair of documents on the list. These documents are deemed connected if they share at least a minimum number of features. In this way the method avoids consideration of all of the unconnected document pairs. The minimum number of features may be system defined or user configurable.

The similarity S of two documents is $$s_{ij} = \frac{|f_i \cap f_j|}{|f_i \cup f_j|}$$

Other graph theoretic techniques can also be used to identify clusters of documents. In general, matrix-based methods to cluster the documents are not used because of the scale of collections to be considered and the sparseness of the graph. Implicitly matrix approaches require dealing with non-useful relations (that is, documents that have no connectivity) in addition to the useful ones.

Connected documents are added to a list and processed for building clusters.

Building Clusters

To build clusters, the sorted graph of connected documents may be traversed or walked. This, like all of the other actions described herein, may be performed by a computer or other computing device. If one of the connected documents of a pair is already in a cluster, then the other one is added to the same cluster. If neither of them is in a cluster, then the two of them form the kernel of a new cluster. As a result, every cluster has at least two similar (connected) documents in it.

Finding Similar Documents

In addition to clustering documents in a batch, it is also possible to use the directed graph connecting documents to features to identify documents that are similar to a selected document. For example, a search query may return a list of documents. If the user selects one document from this list, it may be valuable to know what other documents were similar to it (for example, a near duplicate). The document-feature graph can be used to identify the target document's set of features and then the feature-document graph, can be used to identify what documents share those features.

Figure 6:
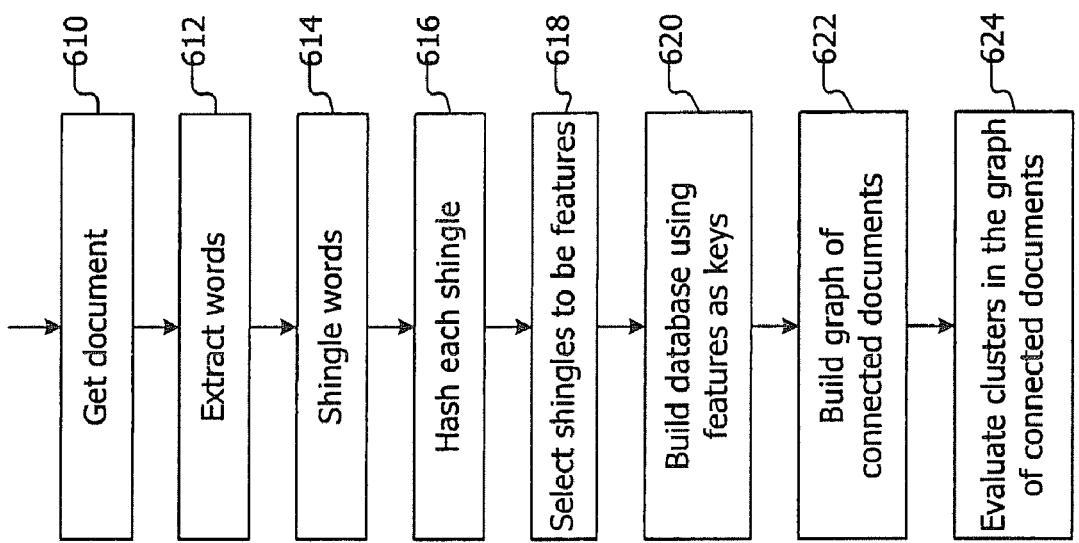
FIG. 6 is a flow chart of the actions taken to achieve an embodiment of a method of quantum clustering of documents.

The various actions taken in implementing a method of quantum clustering described above are set forth in FIG. 6. FIG. 6 is a flow chart of the actions taken to achieve an embodiment of a method of quantum clustering of documents. A document is obtained, as shown in block 610. Words are extracted from the document, as shown in block 612. Words are grouped as shingles, as shown in block 614. In various embodiments, shingles of various sizes may be evaluated, such as for example, shingles of length 2, 3, 4, etc. In one embodiment, shingles of 3 words are identified. Shingles may be identified per sentence, per paragraph, per chapter, per file, or per document, or based on other grouping of words.

Each shingle may be hashed, as shown in block 616. Hashing algorithms that can be used include SHA-1 and MD5. When using shingles, another hashing algorithm that is useful is Rabin fingerprinting. All of these hashing algorithms generate a number from a set of features. If the hash value for two items is different, then there is certainty that the two items that produced that hash were different. On the other hand, if the two hash values are the same, then there is high probability that the two objects were also the same.

Shingles may be selected to be features, as shown in block 618. This selection may be performed according to various methods. One method, as described earlier, is to select those shingles that yield the lowest hash values. Because the hash value is basically random with respect to the characteristics of the item, this selection has the effect of selecting random features. On the other hand, because the same item always hashes to the same value, the same feature in different documents will hash to the same value and, therefore, be likely to be selected. A database using the features as keys and documents as content is built, as shown in block 620. The database may be referred to as a feature-document database. The database may be stored on a storage medium on a computing device, such as, for example, the hard disk of a computer. A graph of connected documents is built, as shown in block 622. The graph may be similar to that shown in FIG. 5. Clusters in the graph of connected documents may be identified and evaluated, as shown in block 624. The clusters may be identified by walking or otherwise traversing the directed graph, and may be achieved using computer algorithms as described above.

Figure 7:
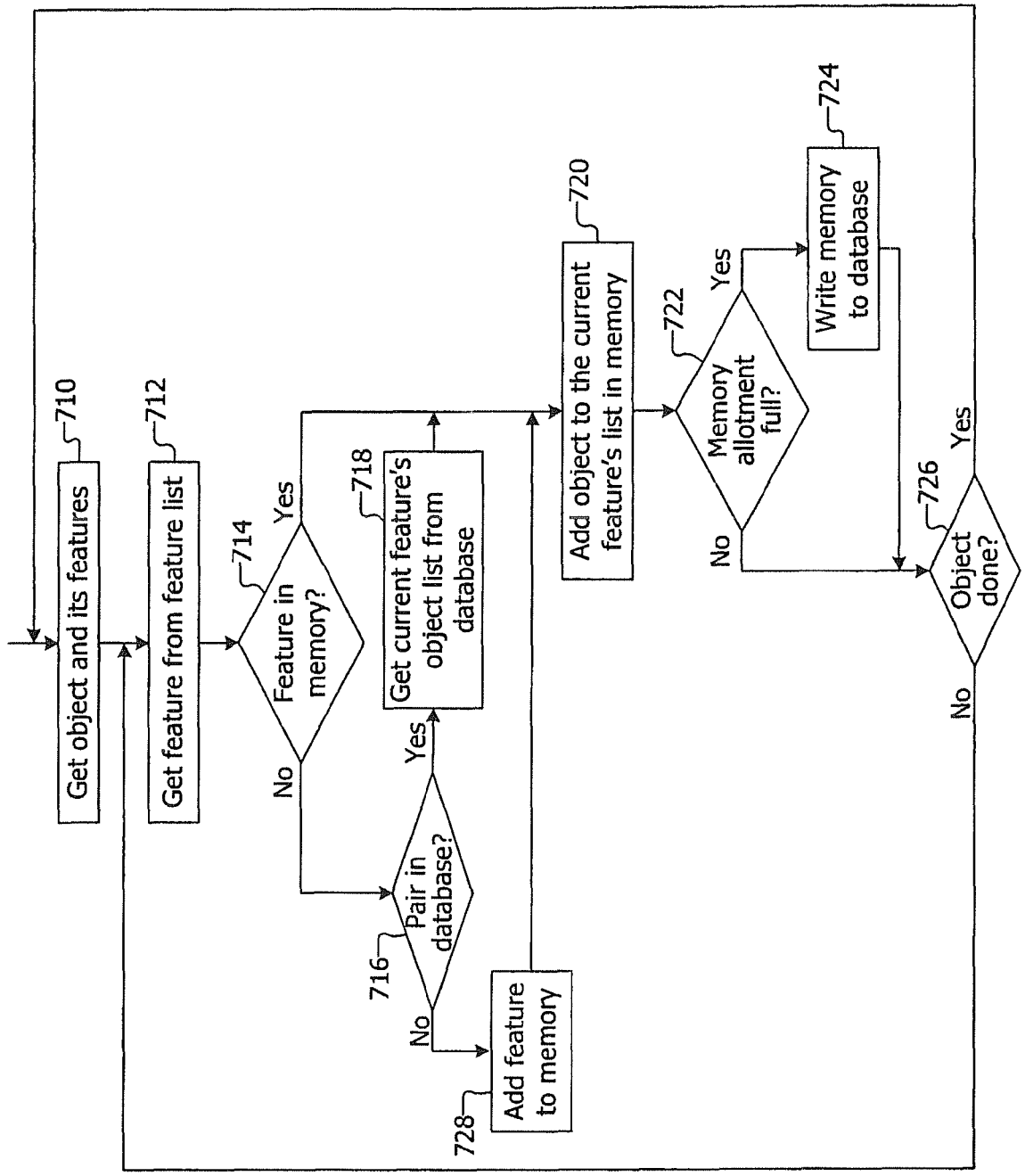
FIG. 7 is a flow chart of the actions taken to build a database of objects and features.

FIG. 7 is a flow chart showing the actions taken to build a database of objects and features. This flow chart describes an example implementation of the construction of a database according to the quantum clustering method described herein. The feature-object database may be stored on a hard disk or other storage device. This figure and related discussion apply to all kinds of objects, including files and documents. Objects and their corresponding features are provided to the clustering system as shown in Block 710. To construct a feature-object database of objects accessible by features, the following actions may be taken. The features are selected in turn from those characteristic of, that is, representative of, the object, as shown in block 712. All of the object's features may be used. Or a subset of the features may be used, such as those preserved in a sketch as described above. Note that blocks 710 and 712 of FIG. 7 correspond to blocks 410 and 412 of FIG. 4.

A check is made to determine whether the feature is in memory, as shown in block 714. If the feature is not in memory, as shown in block 714, a check is made to determine whether the feature is in the feature-object database, as shown in block 716. If the feature is in the feature-object database, the feature's object list is obtained from the feature-object list database, as shown in block 718 and the object is added to the feature's list in memory, as shown in block 720. If the feature is neither in memory as shown in block 714 nor in the feature-object database, as shown in block 716, then the feature is added to memory, as shown in block 728. Once the feature is in memory, as shown in blocks 714, 718 and 728, the object is added to that feature's list in memory, as shown in block 720.

A check is made to determine whether the allotted memory is full, as shown in block 720. If the allotted memory is full, the memory is written to the feature-object list database, as shown in block 722. If the allotted memory is not full, as shown in block 720 or after the memory is written to the database, as shown in block 722, a check is made to determine whether evaluation of the object is complete or done, as shown in block 724. If evaluation of the object is complete, that is, there are no more features for the object to evaluate, as shown in block 724, a new object is obtained and the flow of actions continues with block 710. If the evaluation of the object is not complete, as shown in block 724, the flow of actions continues with block 712.

Figure 8:
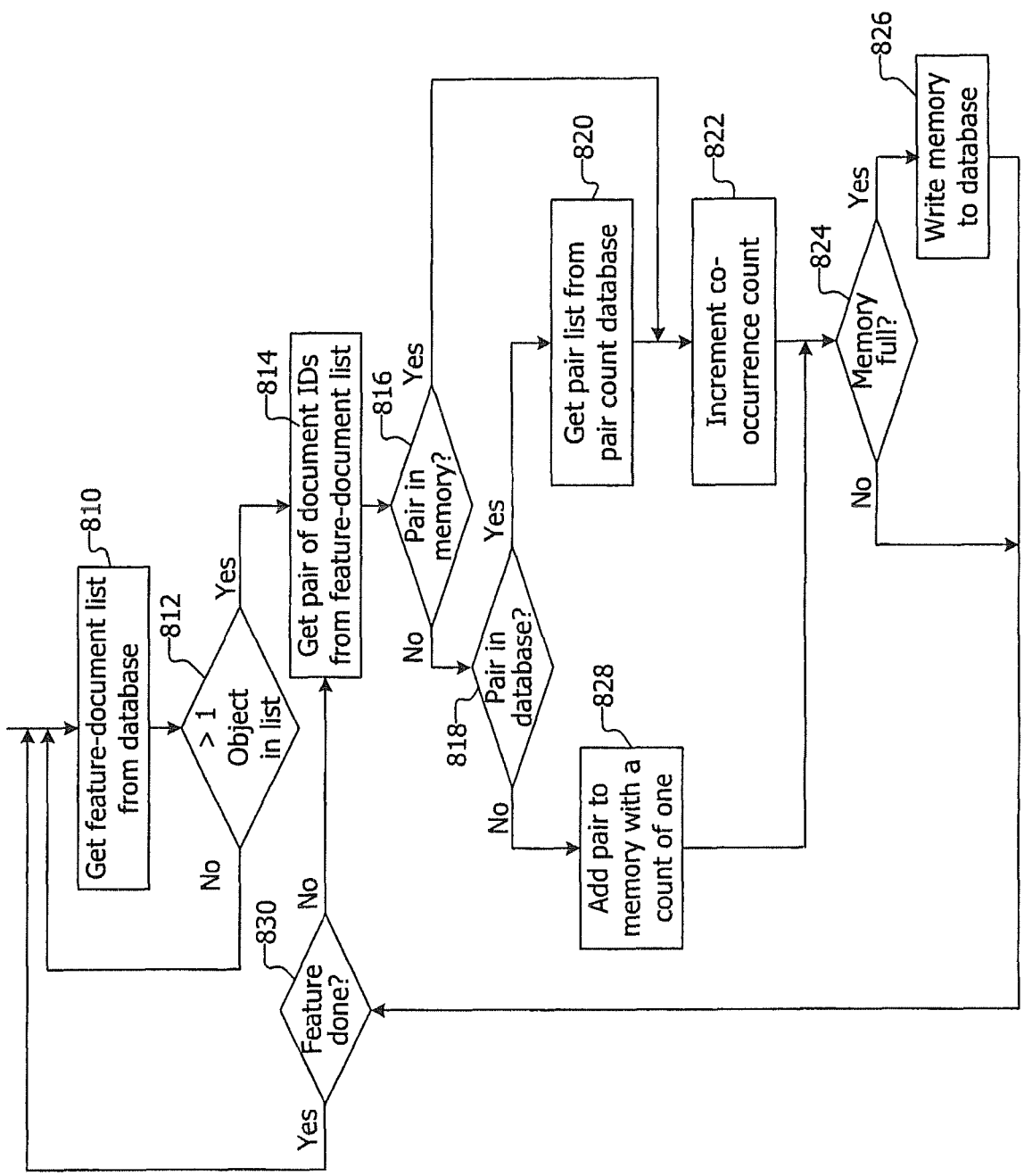
FIG. 8 is a flow chart of the actions taken to build a representation to enable quantum clustering.

FIG. 8 is a flow chart showing the actions taken to build a representation to enable quantum clustering. This flow chart describes an example implementation of the construction of a representation such as a directed graph to enable the quantum clustering method described herein. A feature-document list is obtained from a feature-document list database, as shown in block 810. A feature-document list consists of a feature and all of the documents that contain that feature. The feature-document database may be created according to the method described regarding FIG. 7. The feature-document database may be stored on a hard disk or other storage medium. Although this figure and related discussion are described as applying to documents, this method applies to objects including files, documents, and others. A check is made to determine whether there is more than one document in the list list, as shown in block 812. If there is only one document on the list, then this feature cannot be used to cluster documents—the feature is unique to a single document. An additional feature-document list may be obtained from the feature-document list database, and the flow of action loops back to block 810. If there is more than one document in the feature-document list, as shown in block 812, the flow of actions continues with block 814 where pairs of document identifiers are obtained from the feature-document list.

A check is made to determine whether the current pair is in memory, as shown in block 816. If the pair is not in memory, as shown in block 816, a check is made to determine whether the pair is in the pair count database, as shown in block 818. If the pair is in the pair count database, as shown in block 818, the pair is obtained from the pair count database, as shown in block 820.

After the pair count is obtained from the pair count database, as shown in block 820, or when the pair is in memory, as shown in block 816, a co-occurrence count is updated, as shown in block 820. A check is then made to determine whether the memory allotment is full, as shown in block 824.

Returning to a discussion of block 816 and 818, if the pair is neither in memory, nor in the database, as shown in blocks 816 and 818, the pair is added to memory with a count of one, as shown in block 828. The count of one signifies that these documents share at least one feature. The flow of actions continues at block 824.

If the memory allotment is full, as shown in block 824, the pair counts in memory are written to the pair count database, as shown in block 826. If the memory allotment is not full, as shown in block 824 or after the memory is written to the database, as shown in block 826, the flow of actions continues at block 830 where a check is made to determine whether evaluation of the feature is done. Evaluation of the feature is done when all document pairs that share the feature have been counted. If evaluation of the feature is done, as shown in block 830, the flow of actions returns to the beginning at block 810.

If evaluation of the feature is not done, that is, is not complete, as shown in block 830, the flow of actions returns to block 814.

Figure 9:
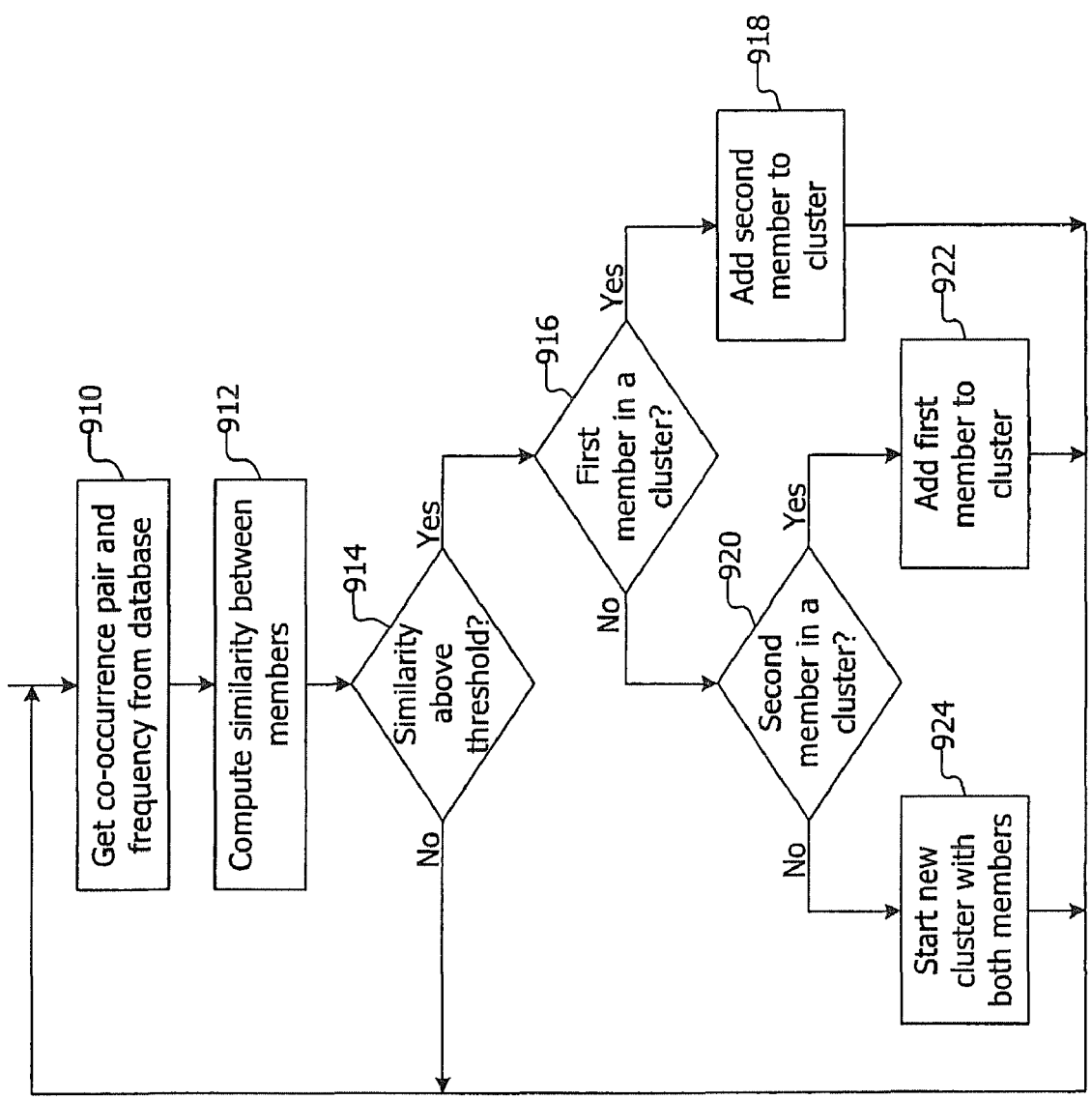
FIG. 9 is a flow chart of the actions taken in an implementation of a method of quantum clustering of documents.

FIG. 9 is a flow chart showing the actions taken in an implementation of a method of quantum clustering of documents into clusters. A co-occurrence pair and frequency are obtained from the pair count database, as shown in block 910. The similarity between the two documents in the pair is computed, as shown in block 912. A check is made to determine whether the similarity is below a threshold, as shown in block 914. The threshold may be system defined or it may be user configurable. If the similarity is below the threshold, as shown in block 914, the method returns to block 910. If the similarity is above the threshold, as shown in block 914, a check is made to determine whether the first member of the pair is in a cluster, as shown in block 916. If the first member of the pair is in a cluster, as shown in block 916, the second member of the pair is added to the cluster, as shown in block 918, and the flow of actions continues at block 910. If the first member of the pair is not in a cluster, as shown in block 916, a check is made to determine whether the second member of the pair is in a cluster, as shown in block 920. If the second member of the pair is in a cluster, as shown in block 920, the first member is added to the cluster, as shown in block 922, and the flow of actions continues at block 910. If the second member of the pair is not in a cluster, as shown in block 920, a new cluster is started with both members of the pair, as shown in block 924, and the flow of actions continues at block 910.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

What is claimed:

1. A computing device having a processor and accessible computer readable storage media, the storage media having instructions thereon that when executed by the processor cause the computing device to perform a method for relating objects, the method comprising:

forming a directed graph of connected objects from a feature-object database,
wherein the feature-object database comprises,
a plurality of feature-object database keys, each feature-object database key comprising a feature value calculated from a feature extracted from an object; and
at least one feature-object database value corresponding to each feature-object database key, the at least one feature-object database value comprising an object identifier identifying an object having the feature corresponding to the corresponding feature-object database key; and
wherein the forming a directed graph comprises,
selecting keys from the feature object database, the selected keys having a plurality corresponding feature-object database values, and for each selected key, selecting the corresponding feature-object database values and adding the corresponding object identifiers as connected nodes in the directed graph of connected objects; and
calculating the number of shared features between pairs of objects, wherein a magnitude of an edge between two connected nodes is related to the number of shared features between the two objects represented by the connected nodes; and
identifying clusters each comprising a plurality of connected objects from the directed graph of connected objects.

2. The computing device of claim 1 wherein the calculating the number of shared features comprises incrementing a pair-count for each pair of object identifiers appearing as selected feature-object database values.

3. The computing device of claim 1 wherein the directed graph of connected objects is represented by a connected objects database, the connected objects database having keys comprising pairs of object identifiers and values comprising the number of shared features between the pair of objects identified by the corresponding connected objects database key.

4. The computing device of claim 1 wherein the identifying clusters comprises walking the directed graph of connected objects to determine which objects share a system defined or user defined number of features to be considered a cluster.

5. The computing device of claim 1 wherein the method for relating objects further comprising constructing the feature-object database, wherein the constructing comprises:
obtaining an object;
extracting features from the object;
calculating feature values for the extracted features;
building the feature-object database.

6. The computing device of claim 5 wherein at least some of the feature values are continuous and wherein the feature values are quantized, the quantizing comprising identifying the feature values as discrete or continuous and transforming the identified continuous feature values into discrete feature values.

7. The computing device of claim 5 wherein only a subset of extracted features are selected to build the feature-object database.

8. The computing device of claim 7 wherein the subset of extracted features is randomly selected from the set of all extracted features.

9. The computing device of claim 7 wherein the subset of extracted features is selected based upon a measure of how strongly the features are descriptive of the object from which they were extracted.

10. The computing device of claim 1 wherein each feature is extracted from an object selected from the group consisting of document files produced by word processors, text files, portable document format files, audio files, video files, still image files, mark-up files, and combinations thereof.

11. The computing device of claim 1 wherein each extracted feature comprises a word or groups of words.

12. A storage medium having instructions stored thereon which when executed by a processor cause the processor to perform the actions comprising:

forming a directed graph of connected objects from a feature-object database,
wherein the feature-object database comprises,
a plurality of feature-object database keys, each feature-object database key comprising a feature value calculated from a feature extracted from an object; and
at least one feature-object database value corresponding to each feature-object database key, the at least one feature-object database value comprising an object identifier identifying an object having the feature corresponding to the corresponding feature-object database key; and
wherein the forming a directed graph comprises,
selecting keys from the feature object database, the selected keys having a plurality corresponding feature-object database values, and for each selected key selecting the corresponding feature-object database values and adding the corresponding object identifiers as connected nodes in the directed graph of connected objects; and
calculating the number of shared features between pairs of objects,
wherein a magnitude of an edge between two connected nodes is related to the number of shared features between the two objects represented by the connected nodes; and
identifying clusters each comprising a plurality of connected objects from the directed graph of connected objects.

13. The storage medium of 12 wherein the calculating the number of share features comprises incrementing a pair-count for each pair of object identifiers appearing as selected feature-object database values.

14. The storage medium of claim 12 wherein the directed graph of connected objects is represented by a connected objects database, the connected objects database having keys comprising pairs of object identifiers and values comprising the number of shared features between the pair of objects identified by the corresponding connected objects database key.

15. The storage medium of claim 12 wherein the identifying clusters comprises walking the directed graph of connected objects to determine which objects share a system defined or user defined number of features to be considered a cluster.

16. The storage medium of claim 12 having further instructions stored thereon which when executed by a processor cause the processor to perform further action comprising constructing the feature-object database, wherein the constructing comprises:
obtaining an object;
extracting features from the object;

calculating feature values for the extracted features;
building the feature-object database.

17. The storage medium of claim 16 wherein at least some of the feature values are continuous and wherein the feature values are quantized, the quantizing comprising identifying the feature values as discrete or continuous and transforming the identified continuous feature values into discrete feature values.

* * * * *